(12) United States Patent
Yang et al.

(10) Patent No.: US 7,926,366 B2
(45) Date of Patent: Apr. 19, 2011

(54) TACTILE SENSING ARRAY AND MANUFACTURING METHOD THEREOF

(75) Inventors: Yao-Joe Yang, Taipei (TW); Ming-Yuan Cheng, Taipei (TW); Chen-Mo Taso, Taipei (TW)

(73) Assignee: National Taiwan University, Taipei (TW)

( * ) Notice: Subject to any disclaimer, the term of this patent is extended or adjusted under 35 U.S.C. 154(b) by 206 days.

(21) Appl. No.: 12/476,248

(22) Filed: Jun. 1, 2009

(65) Prior Publication Data

US 2010/0224010 A1 Sep. 9, 2010

(30) Foreign Application Priority Data

Mar. 3, 2009 (TW) ............................... 98106896 A

(51) Int. Cl.
*G01D 7/00* (2006.01)
(52) U.S. Cl. .................................... 73/862.046; 29/595
(58) Field of Classification Search ........ 73/862.041–862.046; 29/595
See application file for complete search history.

(56) References Cited

U.S. PATENT DOCUMENTS

| | | | | |
|---|---|---|---|---|
| 4,450,324 A * | 5/1984 | Fukukura et al. | ............. | 200/5 A |
| 4,492,949 A | 1/1985 | Peterson et al. | | |
| 4,633,889 A * | 1/1987 | Talalla et al. | ................. | 607/117 |
| 4,852,443 A * | 8/1989 | Duncan et al. | ................. | 84/733 |
| 4,924,711 A * | 5/1990 | Reilly | ..................... | 73/862.046 |
| 5,305,017 A * | 4/1994 | Gerpheide | .................... | 345/174 |
| 7,262,480 B2 * | 8/2007 | Kyogoku et al. | ............. | 257/531 |
| 7,546,006 B1 * | 6/2009 | Fan et al. | ........................ | 385/18 |

* cited by examiner

*Primary Examiner* — Max Noori
(74) *Attorney, Agent, or Firm* — Muncy, Geissler, Olds & Lowe, PLLC

(57) ABSTRACT

In a tactile sensing array and its manufacturing method, the tactile sensing array includes first and second electrodes at different layers, conductors provided for cladding intersection positions of the first and second electrodes, and a cladding layer for cladding the first and second electrodes and conductors. Each of the first and second electrodes is a spiral conducting wire wound onto an elastic wire. During manufacture, a cladding layer solution is injected into a mold; first electrodes are installed in rows and apart, and each first electrode includes conductor solution drops; second electrodes are installed at the conductor solution drops; a cladding layer solution is injected again; and vacuum, heating and demolding process are performed. The invention has the effects of high extensibility, high elasticity and low manufacturing cost and prevents damages caused by high deformation when the tactile sensing array is used and covered onto a complicated surface.

18 Claims, 4 Drawing Sheets

TACTILE SENSING ARRAY AND MANUFACTURING METHOD THEREOF

FIELD OF THE INVENTION

The present invention relates to a tactile sensing array and a manufacturing method thereof, in particular to a tactile sensing array and its manufacturing method that achieves the effects of high extensibility, high elasticity and low manufacturing cost, and prevents damages caused by high deformation when the tactile sensing array is used and covered onto a complicated surface.

BACKGROUND OF THE INVENTION

As shown in FIG. 10, a conventional tactile sensing array 6 (as disclosed in U.S. Pat. No. 4,492,949) includes a bottom layer 61, a middle layer 62 and a top layer 63 stacked on one another, and a plurality of longitudinally installed first conductors 64 are installed between the bottom layer 61 and the middle layer 62, and a plurality of transversally installed second conductors 65 are installed between the middle layer 62 and the top layer 63, and the middle layer 62 includes a plurality of conducting portions 66 in contact with the first and second conductors 64, 65 respectively, wherein the bottom layer 61, the middle layer 62 and the top layer 63 are flexible printed circuit boards, and the first and second conductors 64, 65 are made of a soft plastic material doped with conductors, such that the tactile sensing array 6 can be applied to a required device or apparatus. If a force is applied to the bottom layer 61 or the top layer 63, each conducting portion 66 on the middle layer 62 can be used for electrically connecting the first and second conductors 64, 65 for an electric transmission to achieve the tactile sensing effect.

The conventional tactile sensing array 6 adopts doped conductors, and thus the manufacturing cost is higher. Furthermore, the bottom layer 61, middle layer 62, top layer 63 and first and second conductors 64, 65 are limited to their materials and structures, so that the extensibility and elasticity of the tactile sensor 6 are lower, and the scope of applicability of the conventional tactile sensing array 6 becomes narrower, and it is relatively difficult to apply the conventional tactile sensor 6 to a complicated cambered surface. Since the first and second conductors 64, 65 are made of a soft plastic doped with conductors, a discontinuous contact between conductors may occur easily, so that the resistance of the first and second conductors 64, 65 becomes greater, or even a short circuit may result, due to the deformation.

Therefore, it is a major subject for the present invention to disclose a tactile sensing array and its manufacturing method, and the tactile sensing array has the effects of high extensibility, high elasticity and low manufacturing cost and prevents damages caused by high deformation when the tactile sensing array is used and covered onto a complicated surface.

SUMMARY OF THE INVENTION

In view of the shortcomings of the conventional tactile sensing array and its manufacturing method, the inventor of the present invention based on years of experience in the related industry to conduct extensive researches and experiments, and finally developed a tactile sensing array and its manufacturing method in hope of achieving the effects of high extensibility, high elasticity and low manufacturing cost and preventing damages caused by high deformation when the tactile sensing array is used and covered onto a complicated surface.

Therefore, it is a primary objective of the present invention to provide a tactile sensing array and a manufacturing method thereof, wherein a plurality of first and second electrodes disposed on different layers and spirally wound by conducting wires, and an elastic conductor and a cladding layer are provided together to achieve the effects of high extensibility, high elasticity and low manufacturing cost and prevent damages caused by high deformation when the tactile sensing array is used and covered onto a complicated surface.

To achieve the foregoing objective, the present invention discloses a tactile sensing array comprising: a plurality of first electrodes, arranged in rows and spaced apart from each other, and each first electrode including a first elastic wire, and a first conducting wire spirally wound around the first elastic wire; a plurality of second electrodes, arranged in rows and spaced apart from each other, and each second electrode including a second elastic wire, and a second conducting wire spirally wound around the second elastic wire, and the second electrodes being spaced apart from the adjacent first electrodes; a plurality of conductors, disposed at an intersection position of the first electrode and the second electrode for cladding the first electrode and the second electrode; and a cladding layer, being a soft material, for cladding the first electrodes, the second electrodes and the conductors.

The tactile sensing array manufacturing method comprises the steps of:

(1) injecting a cladding layer solution into a mold;

(2) arranging a plurality of first electrodes in rows with an interval from each other on the cladding layer solution, and each first electrode having a first elastic wire, and a first conducting wire spirally wound around the first elastic wire;

(3) dropping a plurality of conductor solution drops onto the first electrodes;

(4) arranging a plurality of second electrodes in rows with an interval from each other, such that the second electrodes and the first electrodes are spaced apart and adjacent to each other, and the conductor solution drops at a plurality of intersection positions of the first electrodes and the second electrodes are cladded onto the first electrode and the second electrode;

(5) injecting the cladding layer solution into the mold, such that the cladding layer solution is cladded onto the first electrodes, the second electrodes and the conductor solution drops; and (6) performing a vacuum process, a heating process and a demolding process sequentially.

The first elastic wires are nylon strings, the second elastic wires nylon strings, the first conducting wires are copper wires, the second conducting wire are copper wires, the conductors are conducting polymers and the cladding layer is polydimethysiloxane.

Therefore, a tactile sensing array and its manufacturing method in accordance with the present invention can achieve the effects of high extensibility, high elasticity and low manufacturing cost and prevent damages caused by high deformation when the tactile sensing array is used and covered onto a complicated surface.

DESCRIPTION OF THE PREFERRED EMBODIMENTS

Other features and advantages of the present invention will become apparent in the following detailed description of the preferred embodiments with reference to the accompanying drawings.

Figure 1:
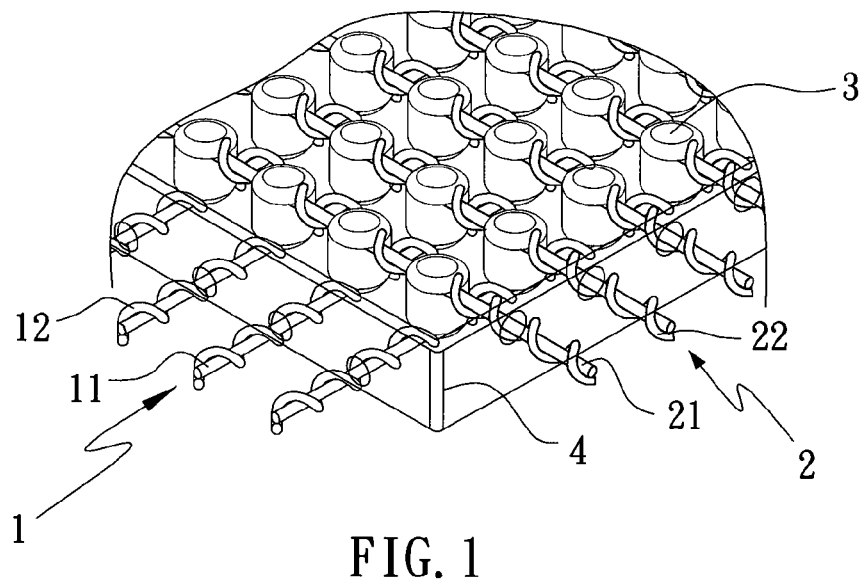
FIG. 1 is a perspective view of a preferred embodiment of the present invention.
Figure 2:
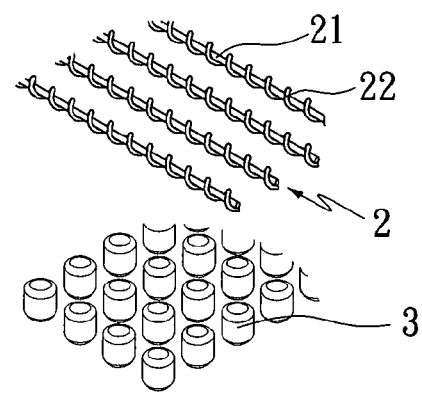
FIG. 2 is an exploded view of a preferred embodiment of the present invention.
Figure 2:
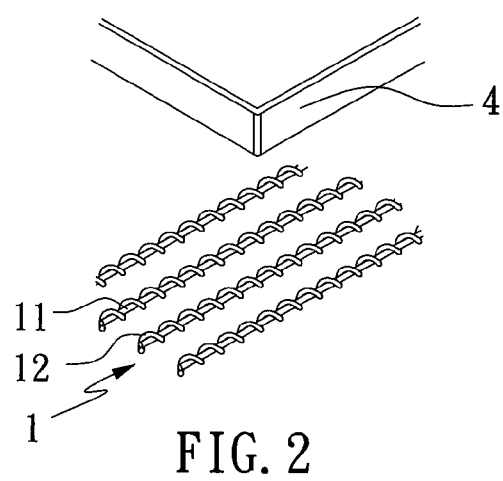
Figure 3:
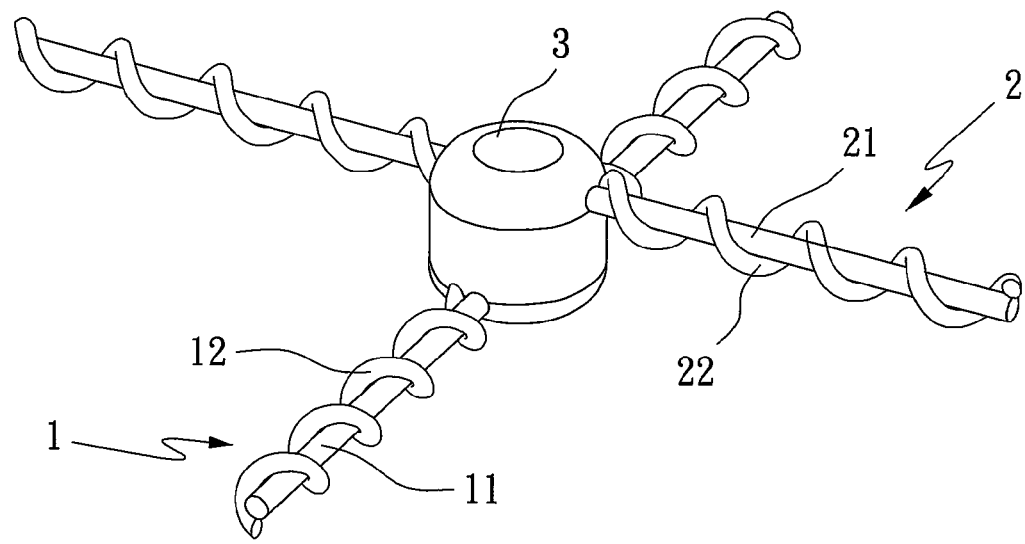
FIG. 3 is a perspective view of first and second electrodes and conductors in accordance with a preferred embodiment of the present invention.

With reference to FIGS. 1 to 3 for a perspective view and an exploded view of a preferred embodiment of the present invention, and a perspective view of first and second electrodes and conductors in accordance with a preferred embodiment of the present invention respectively, a tactile sensing array comprises a plurality of first electrodes 1, a plurality of second electrodes 2, a plurality of conductors 3 and a cladding layer 4.

The first electrodes 1 are arranged in rows and spaced apart from each other, and each first electrode 1 comprises a first elastic wire 11, and a first conducting wire 12 spirally wound around the first elastic wire 11, wherein each first elastic wire 11 is a nylon string or an elastically extendable wire, and each first conducting wire 12 is a copper wire or a metal wire with an electrically conducting effect.

The second electrodes 2 are arranged in rows and spaced apart from each other, and the second electrodes 2 are separated and adjacent to the first electrodes 1, and each second electrode 2 comprises a second elastic wire 21, and a second conducting wire 22 spirally wound around the second elastic wire 21, wherein each second elastic wire 21 is a nylon string or an elastically extendable wire, and each second conducting wire 22 is a copper wire or a metal wire with an electrically conducting effect.

Each conductor 3 installed at an intersection position of the first electrode 1 and the second electrode 2 is cladded onto the first electrode 1 and the second electrode 2, and each conductor 3 is a conducting polymer.

The cladding layer 4 is cladded onto the exterior of each of the first and second electrodes 1, 2 and conductors 3, and the cladding layer 4 is polydimethysiloxane.

If the present invention is applied, the tactile sensing array of the present invention can be used for covering a complicated surface or a surface of a robot and the tactile sensing array can be used as the skin of the robot. Since the cladding layer 4 is made of polydimethysiloxane, the tactile sensing array has excellent extensibility and elasticity, and the first and second conducting wires 12, 22 are continuous bodies spirally wound around the first and second elastic wires 11, 21, so that the first and second electrodes 1, 2 have permanent conductivity and high extensibility. In a practical application of the present invention, the tactile sensing array can be covered onto a complicated surface for the application. In addition, the present invention can prevent short circuits or damages of the first and second electrodes 1, 2 caused by high deformation to enhance the accuracy and stability of its applications.

Figure 4:
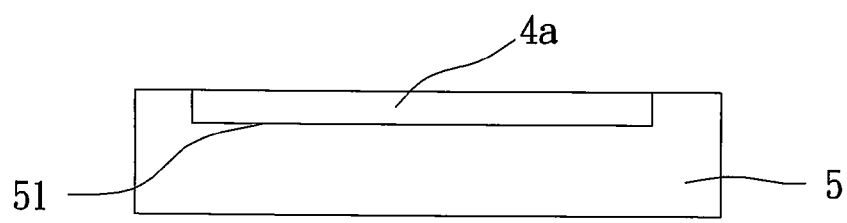
FIG. 4 is a schematic view of Step 1 in accordance with a preferred embodiment of the present invention.
Figure 5:
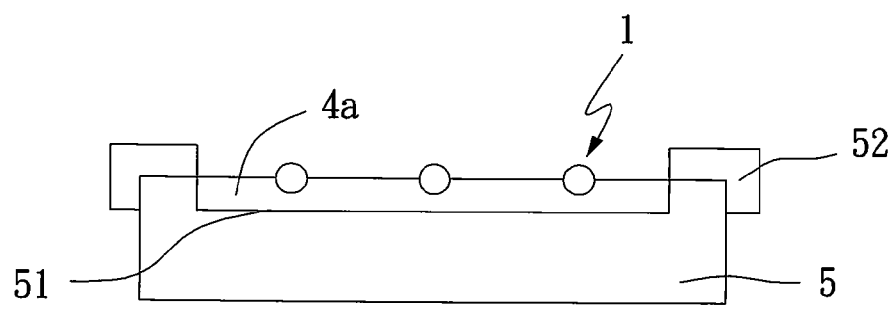
FIG. 5 is a schematic view of Step 2 in accordance with a preferred embodiment of the present invention.
Figure 6:
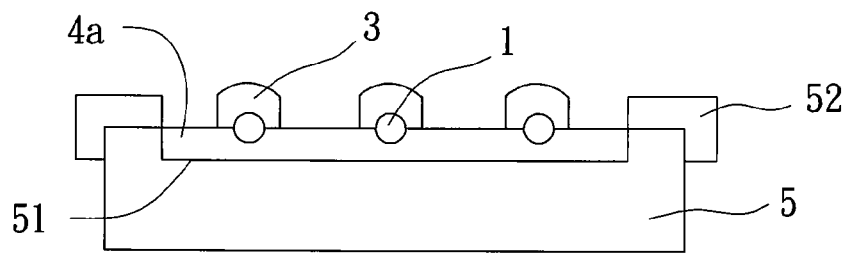
FIG. 6 is a schematic view of Step 3 in accordance with a preferred embodiment of the present invention.
Figure 7:
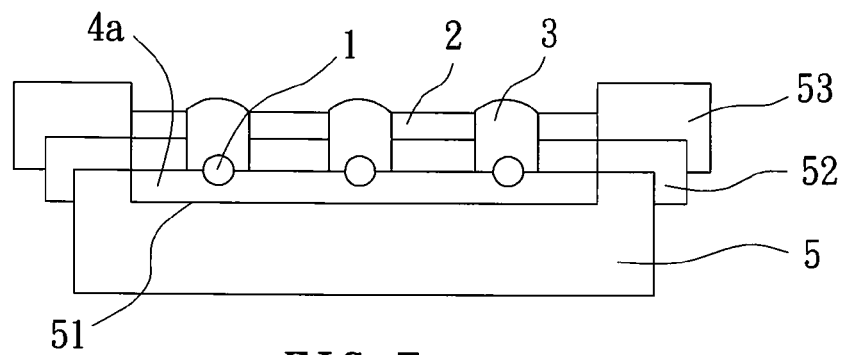
FIG. 7 is a schematic view of Step 4 in accordance with a preferred embodiment of the present invention.
Figure 8:
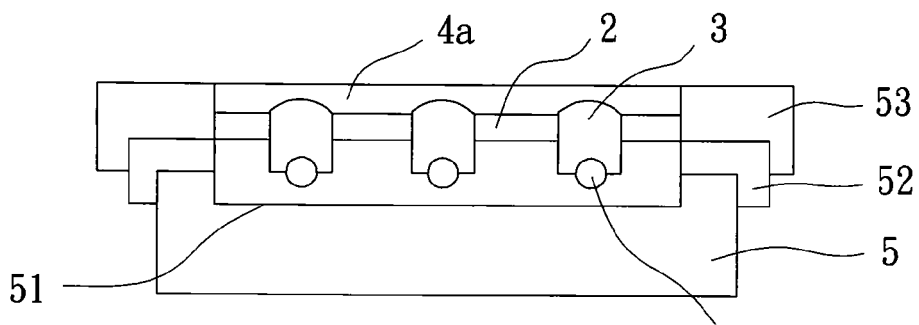
FIG. 8 is a schematic view of Step 5 in accordance with a preferred embodiment of the present invention.
Figure 9:
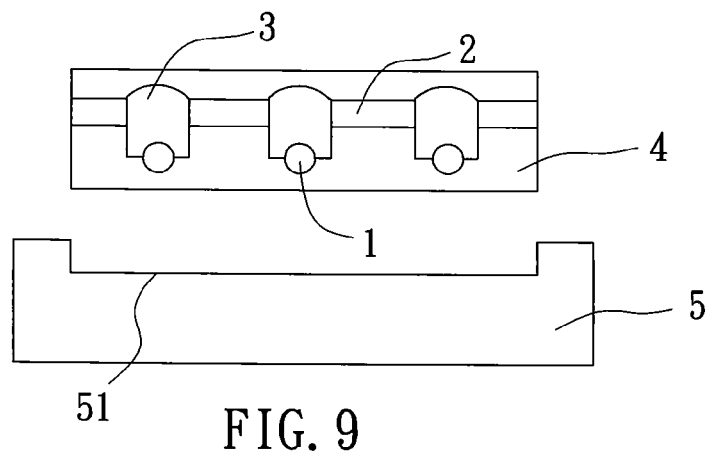
FIG. 9 is a schematic view of Step 6 in accordance with a preferred embodiment of the present invention.
Figure 10:
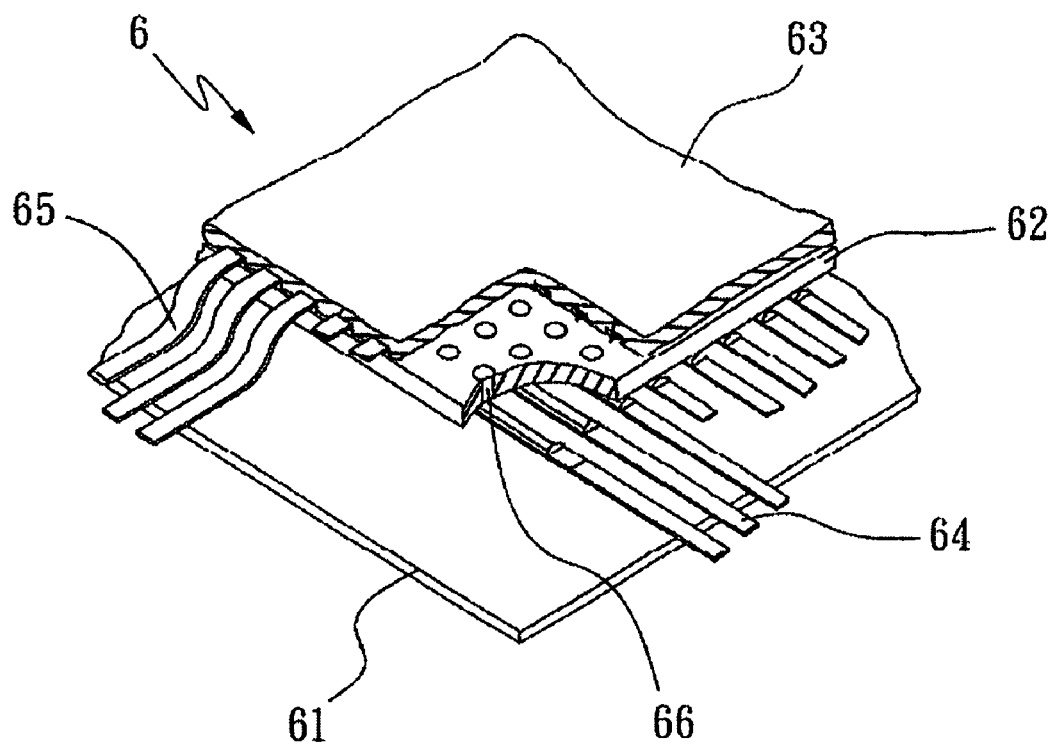
FIG. 10 is a schematic view of a conventional tactile sensing array.

With reference to FIGS. 4 to 9 for schematic views of Steps 1 to 6 of a tactile sensing array manufacturing method in accordance with a preferred embodiment of the present invention respectively, the manufacturing method comprises the steps of:

(1) preparing a mold 5 having at least one cavity 51, and injecting an appropriate quantity of cladding layer solution 4a into the cavity 51 (as shown in FIG. 4);

(2) installing a plurality of first electrodes 1 arranged in rows and spaced apart from each other on the cladding layer solution 4a, and fixing each first electrode 1 by a first frame tool 52 (as shown in FIG. 5);

(3) dropping a plurality of conductor solution drops 3a separately onto an appropriate position of each first electrode 1 (as shown in FIG. 6);

(4) installing a plurality of second electrodes 2 arranged in rows and spaced apart from each other, such that the second electrodes 2 and the first electrodes 1 are separated and adjacent to each other, and the conductor solution drops 3a are dropped at a plurality of intersection positions of the first electrodes 1 and the second electrodes 2 to clad the first electrode 1 and the second electrode 2 respectively, and fixing each second electrode 2 by a second frame tool 53 (as shown in FIG. 7);

(5) filling up the cavity 51 of the mold 5 with the cladding layer solution 4a, such that the cladding layer solution 4a is cladded onto the first electrodes 1, the second electrodes 2 and the conductor solution drop 3a (as shown in FIG. 8); and (6) performing a vacuum process, and then performing a heating process, such that the cladding layer solution 4a is solidified to form a cladding layer 4, and the cladding layer 4 is cladded onto the exterior of each of the first and second electrodes 1, 2 and conductors 3, and finally performing a demolding process to complete manufacturing a tactile sensing array (as shown in FIGS. 9 and 1). With the aforementioned manufacturing method, the conventional complicated manufacturing process can be improved to achieve the effect of lowering the manufacturing cost.

In summation of the description above, the present invention complies with the patent application requirements, and the present invention adopts a plurality of first and second electrodes disposed at different layers and spirally wound around by elastic wires wrapped by conducting wires and also adopts a conductor and a cladding layer, such that the tactile sensing array has the effects of high extensibility, high elasticity and low manufacturing cost, and prevents damages caused by high deformation when the tactile sensing array is used and covered onto a complicated surface. Therefore, products manufactured in accordance with the present invention can fully meet the current market requirements.

While the invention has been described by means of specific embodiments, numerous modifications and variations could be made thereto by those skilled in the art without departing from the scope and spirit of the invention set forth in the claims.

What is claimed is:

1. A tactile sensing array, comprising:
a plurality of first electrodes, arranged in rows and spaced apart from each other, and each first electrode including a first elastic wire, and a first conducting wire spirally wound around the first elastic wire;
a plurality of second electrodes, arranged in rows and spaced apart from each other, and each second electrode including a second elastic wire, and a second conducting wire spirally wound around the second elastic wire, and the second electrodes being spaced apart from the adjacent first electrodes;

a plurality of conductors, disposed at intersection positions of the first electrodes and the second electrodes for cladding the first electrodes and the second electrodes respectively; and a cladding layer, being a soft material, for cladding the first electrodes, the second electrodes and the conductors.

2. The tactile sensing array of claim 1, wherein the first elastic wires are nylon strings, and the second elastic wires are nylon strings.

3. The tactile sensing array of claim 1, wherein the first conducting wires are copper wires, and the second conducting wires are copper wires.

4. The tactile sensing array of claim 2, wherein the first conducting wires are copper wires and the second conducting wires are copper wires.

5. The tactile sensing array of claim 1, wherein the conductors are conducting polymers.

6. The tactile sensing array of claim 4, wherein the conductors are conducting polymers.

7. The tactile sensing array of claim 1, wherein the cladding layer is polydimethysiloxane.

8. The tactile sensing array of claim 6, wherein the cladding layer is polydimethysiloxane.

9. A tactile sensing array manufacturing method, comprising the steps of:

(1) injecting a cladding layer solution into a mold;

(2) arranging a plurality of first electrodes in rows with an interval from each other on the cladding layer solution, and each first electrode having a first elastic wire, and a first conducting wire spirally wound around the first elastic wire;

(3) dropping a plurality of conductor solutions onto the first electrodes;

(4) arranging a plurality of second electrodes in rows with an interval from each other, such that the second electrodes and the first electrodes are separated and adjacent to each other, and the conductor solution drops at a plurality of intersection positions of the first electrodes and the second electrodes are cladded onto the first electrode and the second electrode;

(5) injecting the cladding layer solution into the mold, such that the cladding layer solution is cladded onto the first electrodes, the second electrodes and the conductor solution drops; and (6) performing a vacuum process, a heating process and a demolding process sequentially.

10. The manufacturing method of claim 9, wherein the first elastic wires are nylon strings, and the second elastic wires are nylon strings.

11. The manufacturing method of claim 9, wherein the first conducting wires are copper wires, and the second conducting wires are copper wires.

12. The manufacturing method of claim 10, wherein the first conducting wires are copper wires and the second conducting wires are copper wires.

13. The manufacturing method of claim 9, wherein the conductors are conducting polymers.

14. The manufacturing method of claim 12, wherein the conductors are conducting polymers.

15. The manufacturing method of claim 9, wherein the cladding layer is polydimethysiloxane.

16. The manufacturing method of claim 14, wherein the cladding layer is polydimethysiloxane.

17. The manufacturing method of claim 9, wherein the first electrodes and the second electrodes are fixed by a first frame tool and a second frame tool respectively in the steps (2) and (4).

18. The manufacturing method of claim 16, wherein the first electrodes and the second electrodes are fixed by a first frame tool and a second frame tool respectively in the steps (2) and (4).

* * * * *